(12) United States Patent
Diaz et al.

(10) Patent No.: US 8,485,178 B2
(45) Date of Patent: Jul. 16, 2013

(54) SOLAR WATER HEATING SYSTEM WITH A BACKUP WATER HEATER, AND ELECTRONIC TEMPERATURE CONTROL FOR A BACKUP HEATER IN A FORCED CIRCULATION SOLAR WATER HEATING SYSTEM

(75) Inventors: Rocio Meza Diaz, Delegación Coyoacán (MX); Carlos Alejandro Silva Imilan, Delegación Tlalpan (MX)

(73) Assignee: Calentadores de America, S.A: DE C.V., Meixco City (MX)

( * ) Notice: Subject to any disclaimer, the term of this patent is extended or adjusted under 35 U.S.C. 154(b) by 1448 days.

(21) Appl. No.: 12/129,011

(22) Filed: May 29, 2008

(65) Prior Publication Data

US 2009/0120427 A1 May 14, 2009

(30) Foreign Application Priority Data

Nov. 9, 2007 (MX) .................... MX/a/2007/014036

(51) Int. Cl.
*F24J 2/44* (2006.01)
(52) U.S. Cl.
USPC ........... 126/615; 126/616; 126/609; 126/640; 126/638; 237/8 A; 237/19
(58) Field of Classification Search
USPC .... 126/615, 616, 609, 604, 640, 638; 237/19, 237/8 A
See application file for complete search history.

(56) References Cited

U.S. PATENT DOCUMENTS

| | | | | | |
|---|---|---|---|---|---|
| 1,250,260 | A | * | 12/1917 | Wilcox | 126/638 |
| 2,625,138 | A | * | 1/1953 | Jacoby | 122/14.22 |
| 4,004,573 | A | * | 1/1977 | Frieling et al. | 126/615 |
| 4,119,087 | A | * | 10/1978 | Cook | 126/588 |
| 4,165,735 | A | * | 8/1979 | Smith | 126/638 |
| 4,191,329 | A | * | 3/1980 | Geaslin | 126/615 |
| 4,197,446 | A | * | 4/1980 | Kalmanoviz | 392/461 |
| 4,210,125 | A | * | 7/1980 | Fender | 126/587 |
| 4,287,879 | A | * | 9/1981 | Roark | 126/591 |
| 4,300,536 | A | * | 11/1981 | Taschuk | 126/615 |
| 4,385,625 | A | * | 5/1983 | Lee | 126/590 |
| 4,403,602 | A | * | 9/1983 | Warden | 126/610 |
| 4,409,959 | A | * | 10/1983 | Sigworth, Jr. | 126/592 |
| 4,416,256 | A | * | 11/1983 | Korwill | 126/616 |
| 4,479,487 | A | * | 10/1984 | Migdal | 126/588 |

(Continued)

FOREIGN PATENT DOCUMENTS

| | | |
|---|---|---|
| CA | 2 613 129 | 1/2007 |
| DE | 44 43 715 A1 | 6/1996 |

(Continued)

*Primary Examiner* — John K Fristoe, Jr.
*Assistant Examiner* — Minh Le
(74) *Attorney, Agent, or Firm* — Dority & Manning, P.A.

(57) ABSTRACT

The forced recirculation solar water heating system with a backup water heater works through an electronic card that initiates the operation and activation of the water recirculators when there is a setpoint temperature difference between the panel and the storage tank detected by means of a bimetallic cable connected at one of the top ends of the panel and another bimetallic cable at the upper part of the storage tank. This storage tank has a series of safety check valves that prevent temperature loss due to hot water backflow to the hydraulic network or due to natural reverse recirculation, thus avoiding excess pressure in the system.

10 Claims, 2 Drawing Sheets

U.S. PATENT DOCUMENTS

| | | | |
|---|---|---|---|
| 4,564,003 A | 1/1986 | Iwanicki et al. | |
| 4,593,678 A * | 6/1986 | Piper | 126/615 |
| 4,681,154 A | 7/1987 | Yano et al. | |
| 4,852,547 A * | 8/1989 | Thomason | 126/616 |
| 5,900,176 A | 5/1999 | Tassicker et al. | |
| 6,280,180 B1 * | 8/2001 | Fredin-Garcia-Jurado et al. | 431/27 |
| 7,163,619 B2 | 1/2007 | Wang | |
| 2003/0127089 A1 * | 7/2003 | Drummond et al. | 126/638 |
| 2003/0230300 A1 * | 12/2003 | Luo | 126/638 |
| 2006/0219237 A1 * | 10/2006 | Bowen et al. | 126/638 |
| 2007/0157922 A1 * | 7/2007 | Radhakrishnan et al. | 126/609 |
| 2009/0120923 A1 * | 5/2009 | Mayen et al. | 219/270 |
| 2009/0139513 A1 * | 6/2009 | Davis | 126/615 |
| 2010/0163016 A1 * | 7/2010 | Pan | 126/613 |
| 2011/0277744 A1 * | 11/2011 | Gordon et al. | 126/615 |

FOREIGN PATENT DOCUMENTS

| | | |
|---|---|---|
| GB | 2088097 A * | 6/1982 |
| WO | WO 98/04874 | 2/1998 |
| WO | WO 2004/038305 A1 | 5/2004 |
| WO | WO 2005/026627 A1 | 3/2005 |
| WO | WO 2005/040695 A1 | 5/2005 |
| WO | WO 2005/061969 A1 | 7/2005 |
| WO | WO 2007/053859 A2 | 5/2007 |
| WO | WO 2007/057864 A1 | 5/2007 |
| WO | WO 2007/101899 A1 | 9/2007 |

* cited by examiner

SOLAR WATER HEATING SYSTEM WITH A BACKUP WATER HEATER, AND ELECTRONIC TEMPERATURE CONTROL FOR A BACKUP HEATER IN A FORCED CIRCULATION SOLAR WATER HEATING SYSTEM

FIELD OF THE INVENTION

The present invention refers generally to solar water heating equipment of the forced water circulation type which is accompanied by a water heater with an ionized system that provides a constant water supply.

BACKGROUND OF THE INVENTION

Backup systems for solar water heaters are used (mainly in panels with more than 2 m² of capture area) in high hot water demand systems or in processes where a constant hot water supply is necessary. Although there exist auxiliary water heating systems such as those cited in patents No. WO/2007/101899; WO/2007/053859; WO/2007/000112; WO/2005/061969; WO/2005/040695; WO/2005/026627; WO/2004/038305; WO/2002/084037; WO/1998/004874; WO/1996/018072; WO/1995/004905; WO/1982/003271; and WO/1981/002774, for solar water heaters with panels whose capture area is greater than 2 m²; normally traditional water heaters of low input power interconnected with the upper part of the storage tank of the solar panel are used as backup systems to prevent lack of hot water.

To satisfy demand with the greatest possible fuel economy, an electronic system was integrated with a gas electrovalve which gradually ignites the burner of the water heater, in a direct way by means of an electrical spark and a flame detector, such as the one cited in Patent No. WO/2007/057864. However, the water heater described in the aforementioned patent does not adapt itself fully to most hydraulic facilities, and therefore in many cases it is necessary to adapt or integrate other elements for its operation, increasing the equipment and maintenance cost of the entire system.

SUMMARY OF THE INVENTION

Objects and advantages of the invention are set forth in part in the following description, or may be obvious from the description, or may be learned through practice of the invention.

The backup water heating system of the present invention has an ignition system of the ionized type such as the one described in Patent No. WO/2007/057864, with the difference that it only works when an electronic card gives the order to turn on only when a bimetallic detector, located in the lower part of the storage tank of the solar heater, detects a temperature lower than 35° C., and to turn off when the bimetallic cable located at the backup heater water outlet detects a temperature higher than 60° C. The backup water heating system will also turn on when a low pressure flow detector activates, this flow detector being located immediately after the bimetallic cable. It should be noted that the water heater will not be activated unless water demand exists and at the same time the temperature is lower than 35° C. The average time for the backup heater to reach a comfortable temperature is approximately from 1 to 1.5 minutes, and the whole system operates with a 110 V current. Due to the fact that the backup heater gas valve and the recirculation system operate at that voltage; the recirculation system between the panel and the storage tank will work under two conditions: First, when the bimetallic thermopar located on one of the top ends of the panel detects a temperature 2° C. higher than the storage tank temperature, and second, when the storage tank temperature is lower than 10° C.

Although having a solar water heater instead of a traditional water heater means considerable fuel savings, it does not completely satisfy the hot water demand or the fuel savings desired by consumers since it is not satisfactory at the time of the year temperatures are low, because the temperature and gas controls are combined into a single control, or a high voltage power source is necessary to activate some of these controls, or lacking that, it is necessary to have a unique or special feature for the water heater operation.

Due to the lack of constant pressure and flow in residential hydraulic installations, there is a need for a forced recirculation solar water heating system such as the one described in the previous paragraph, to achieve fuel savings greater than those already obtainable by using water heaters that currently complement forced recirculation solar water heaters, and which would be appropriate for the different and diverse hydraulic installations already existing or which could be built in the future, to satisfy a demand for a constant supply of water at a comfortable temperature.

DETAILED DESCRIPTION

Figure 1:
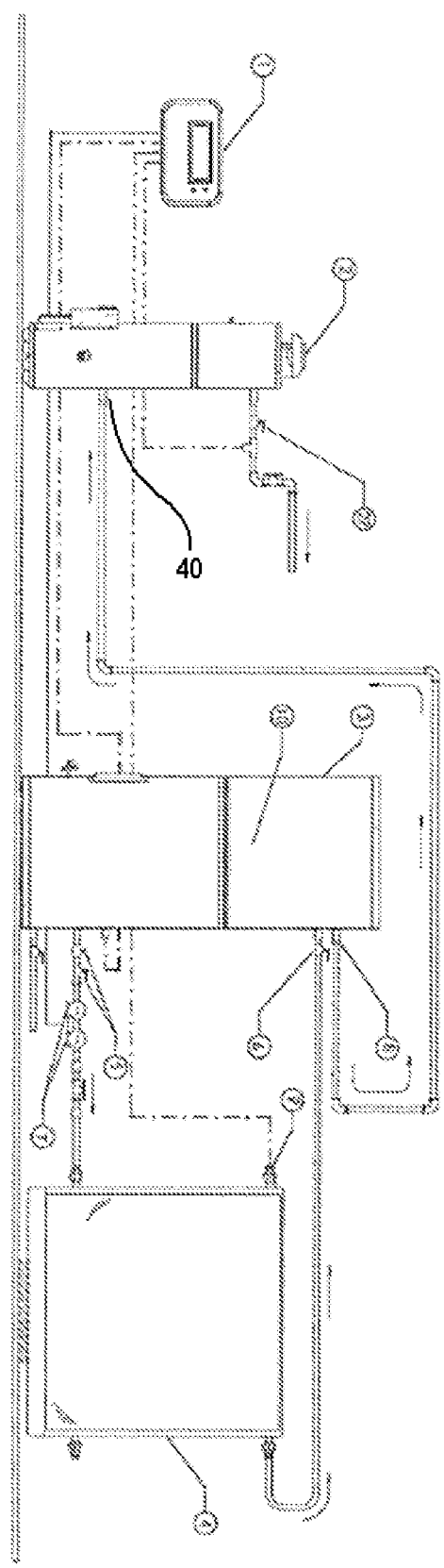
FIG. 1 is a general view wherein all system components take part, that is, panel, storage tank, backup heater and visual indicator or central control, bimetallic cable, set of valves, recirculating pumps, a laminate external body, and a set of safety check valves.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In a particular embodiment illustrated in the figures, the solar panel (4) in front of the gas water heater (2) has a panel with a flat solar capture surface of less than 2 m², which is sufficient to reach a temperature of 50° C. in a storage tank (3) with a capacity of between 200 and 250 liters of water located at the top of the panel in order to achieve a thermosiphon effect. The storage tank (3) has a series of relief check valves (5) which prevent the pressure from building up in the storage tank (3) due to the increase in water temperature, and in turn prevents the hot water backflow into the hydraulic network or a reverse recirculation that would cause an accelerated temperature loss from the storage tank (3).

The inlet couplings (6) of the storage tank (3) are distributed in the following way: to prevent the mixing of cold water with water heated by the panel, the water outlet to the recirculator (7), which is connected to the lower part of the solar panel, must be located in the lowest part in the cold water inlet, for example 5.08 cm (2 inches) above the coupling (6).

The top part of the solar panel (4) is connected to the water return which is located, for example, 5.08 cm (2 inches) below the water outlet to the backup heater (2); the bimetallic cables (8 and 9) are located one, for example at 5.08 centimeters (2 inches) above the coupling (6) of the recirculators (7) and the other at one of the upper ends of the solar panel (4) for the purpose of detecting the most drastic temperature difference and detecting more rapidly the absence of hot water in the storage tank (3).

The storage tank (3) also has a lining of polyurethane (foam) insulation at least 5.08 cm (2 inches) in thickness in order to slow down temperature loss inside the storage tank (3) when the ambient temperature is below 10° C., as well as an external body made of steel laminate (5) protected against corrosion to prevent a rapid deterioration of the lining. In turn, all the metallic parts and materials used in the solar water heater (4) and the storage tank (3) may be corrosion resistant or protected against corrosion by porcelainization and cathodic protection. Once the solar water heater is installed and its compliance with the previously described characteristics verified, the storage tank (3) is connected to the backup water heater (2).

Figure 2:
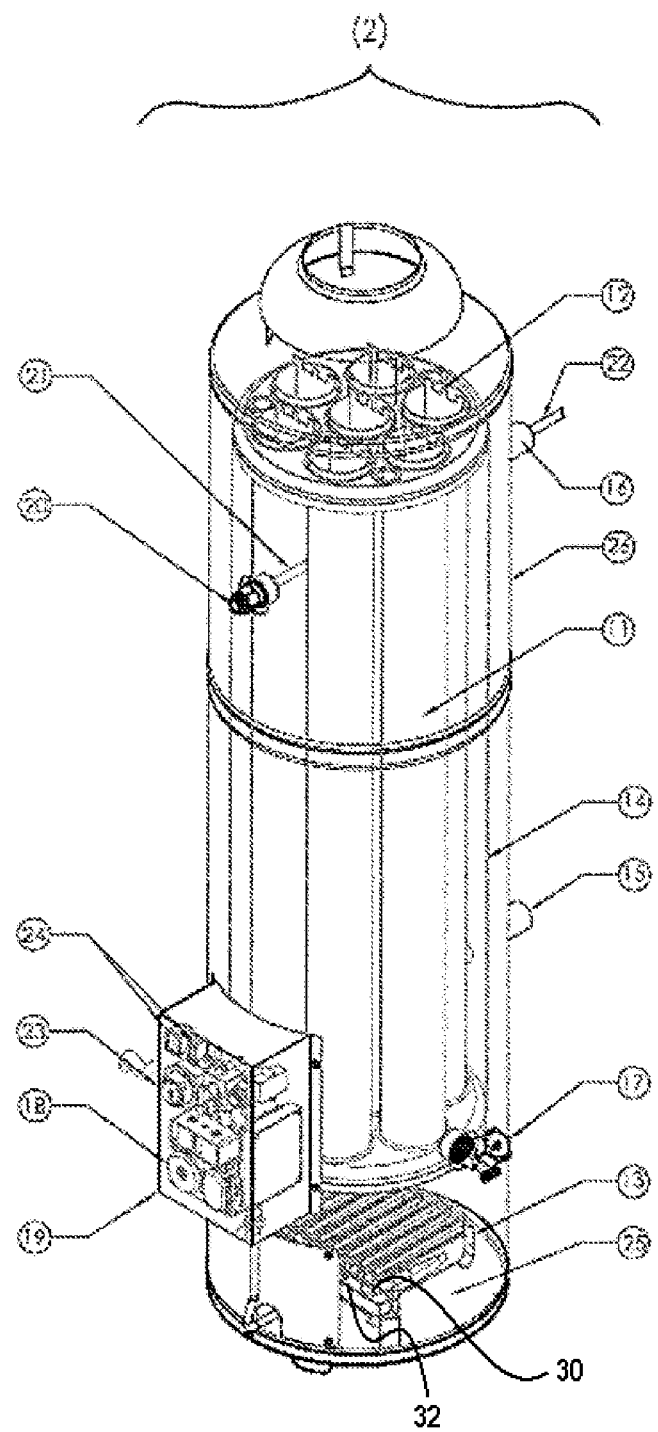
FIG. 2 is a view of the backup heater of the present invention, wherein are located the control module, diffuser, tank, drainage valve, metallic cover, electrovalves, knob, switches, bimetallic cable, bimetallic protection cable, bulb, coil, water outlet, external body, tubes, water inlet, combustion chamber and burner.

As shown in FIG. 2, the backup water heater (2) is designed in such a way that it has a power input between 20 kW and 30 kW, and a set of seven steel tubes (11) forming a heat transfer collector in which the length and diameter of the tubes are specified according to the hot water needs of the user, with the capacity to transfer from 85% to 90% of the input power using a corrugated coil (12) with a series of fins that delay the gas outflow to achieve the maximum utilization of the energy generated by the burner (13), obtaining a temperature no higher than 200° C. This backup heater (2) is designed to have only between 20 dm$^3$ (20 liters) and 40 dm$^3$ (40 liters) of internal volume and to withstand a maximum working pressure of 0.45 MPa and a testing pressure of 1.17 MPa. The entire tank (14) is made of steel and the areas in contact with water are porcelainized, and the capacity and the needs of the user give shape to the tank (14) of the backup heater (2). The water inlet (15) is located in the lower part of the side of the tank (14), and the water outlet (16) is located in the upper part of the side of the tank. Additionally, in the lower part of the tank there is a coupling which connects the exterior with the water contained in the tank (14) in order to place a stopcock or plug (17) to allow for draining and cleaning the tank (14).

Power to the water heater must be supplied by means of a burner (13) with nine multi-burners and a variable nozzle diameter to supply between 20 kW and 30 kW.

The gas fuel is supplied by means of an electrovalve (18), a bimetallic detector, and a switchboard (or control) which are located inside a metallic covering (19) that protects them from the atmosphere. These components are used to control the operation of the backup heater (2) only. The gas electrovalve (18) is connected to the burner (13) by means of an aluminum or copper tube of 9.52 mm (0.375 inches) in diameter and brass or bronze connections of 15.87 mm (0.625 inches) in diameter, and normally must be closed until the switchboard or control gives the signal to open. The gas feed connection to the electrovalve (18) is 12.7 mm (0.5 inches) in diameter and is calibrated between 1.7 kPa and 3.2 kPa, depending on the type of gas to be used.

The bimetallic cable (20) is inserted into a bulb (21) made of brass, bronze, copper or another corrosion resistant and high heat transferring material, in order to detect the temperatures at which the burner (13) is turned on and off. The opposite end of the bimetallic cable (20) is connected to the switchboard or control, as is the electrovalve (18). Additionally, to avoid overheating in the hydraulic network, another bimetallic cable (22) is connected at, for example, 5.08 cm (2 inches) below the top lid of the tank, and said cable acts as a system of protection against high temperatures and is controlled by the switchboard or control.

The switchboard or control, upon translating a temperature signal 25° C. below the temperature indicated by the bimetallic cable (20) which is taken directly from the water contained in the tank (14), sends a direct current electrical spark through a ceramic spark plug connected to the aforementioned switchboard or control by means of a cable covered with silicone and an extension of a reinforced cable. The ceramic spark plug is attached at a distance no greater than, for example, 4 mm onto one of nine multi-burners (13) comprising the burner (13) of the water heater (2). After 1.5 seconds and with the electrical spark in operation, the switchboard or control sends a signal to the electrovalve (18) for its gradual and successive opening to allow for a gradual flow of gas to the burner (13), thus avoiding an excessive gas accumulation in the combustion chamber (25) and preventing possible accidents. Once the burner (13) is ignited, another spark plug (32) attached at a distance not greater than 20 mm onto one of the nine multi burners (13) will detect the flame by means of an ionization process in which the spark generated by the other spark plug (30) changes from direct current to alternating current. This change of current is sent to the switchboard or control by means a spark plug (32) with reinforced cable and followed by a silicone covered cable. If the current change signal is not detected by the switchboard or control within five seconds, or the signal appears intermittently in the same period of time, or if the burner (13) goes out, the switchboard or control sends a signal to the electrovalve (18) and permanently blocks the operation of the heater (2) until it receives a signal to restart from the restart button or, if necessary, technical service intervention in the backup water heater.

Once the current change signal sent by the temperature sensor located in the burner (13) is detected by the switchboard or control, the water inside the tank (14) will be heated until the bimetallic cable (20) sends a signal to the switchboard or control indicating that the temperature defined by the user by means of the knob (23) has been reached, thus turning off the heater (2).

The ignition cycle will not be reactivated until the bimetallic cable (20) sends a signal when the water temperature in the tank (14) is 25° C. lower than the temperature defined with the knob (23). The switchboard or control is fed electrically from a 110 V power source (electrical grid). In turn the switchboard or control will distribute the electrical feed to the different components to which it is connected. Between the power source and the switchboard or control two ON/OFF switches (24) are located to control directly, either manually or automatically, the power fed to the switchboard or control. In automatic mode, the switchboard or control will be controlled by an electronic controller card (1 in FIG. 1) which will administer the power fed to the switchboard or control when the temperature in the storage tank (14) is lower than 35° C. or there is a demand for water, and it will it cut off when the temperature at the backup water heater (2) outlet is equal to 60° C. independently of the temperature controls. In manual mode the switchboard or control, the bimetallic cable (20) and the bimetallic protection cable (22) of the backup heater (2) will be independent of the electronic card. The electronic card will have a red visual indicator that shows that the backup heater (2) is in error and must be restarted.

The tank (14) is supported upon a combustion chamber (25) of, for example, 20.32 cm (8 inches) in height and a diameter smaller than the outside diameter of the tank (14), but strong enough to withstand the weight of the backup heater (2) when full of water. Inside the combustion chamber (25) are located the burner (13) with the spark plugs (30) and (32) attached to it and connected to the switchboard or control. The combustion chamber (25) is attached to a base which has a series of openings to provide the air flow necessary for combustion to take place and a height of 40 mm to allow for the airflow to circulate toward the burner (13). The combustion chamber (25) is insulated with a layer of ceramic fiber from, for example, 5.08 to 7.62 cm (2 to 3 inches) in thickness and only the burner (13) gate is left free in order to have access when it is necessary to conduct maintenance. The rest of the tank (14) is insulated with thermal fiberglass from 5.08 to 7.62 cm (2 to 3 inches) in thickness.

The insulated tank (14) and combustion chamber (25) are placed inside of an external body comprising a laminate (26) which is coated with a corrosion resistant electrostatic paint. This external body (26) is attached to the base of the combustion chamber (25) and covered with a laminate lid containing openings wherein the tubes for feeding water to the tank (14) are located; like the external body (26), the lid and the external base must be protected by a corrosion resistant electrostatic paint. The external body (26) has four openings of different sizes; the largest opening, located near the burner (13), allows the spark plug cables to pass through, as well as the tube connecting the gas electrovalve (18) to the burner (13), which permits maintenance to the burner; this opening is later covered with a lid. This lid is attached by means of screws to provide easy access to the burner (13) when maintaining the water heater (2), and must be coated with a corrosion and temperature resistant electrostatic paint.

The openings located in the anterior part of the external body (26) allow the bimetallic cable (20) and the bimetallic protection cable (22) to pass through. The electrovalve (18), the bimetallic detectors (20 and 22) and the switchboard or control are also attached to the anterior part of the external body (26). This set of components is covered with a laminate lid (19), which is coated with corrosion resistant electrostatic paint, leaving the buttons to turn on the equipment visible. The last opening is located on one side of the external body at the level of the drainage coupling (17) where a drainage stopcock is placed for tank (14) maintenance.

The backup water heater (2) thus described is connected to the storage tank (3) outlet by means of a corrosion resistant metallic tubing of, for example, 1.90 cm (0.75 inches); the backup heater (2) will be ignited only when there is a demand for water and the temperature is lower than 35° C., and it will turn off when the cut-off temperature of 60° C. is reached.

The set of check valve (5), the insulation of the storage tank (3), the location of the bimetallic detector (8) in the storage tank (3), as well as at the backup heater (2) outlet, and the ignition conditions for the backup heater (2) prevent any significant temperature loss in the storage tank (3), and together with the fact that the backup heater (2) only ignites when large quantities of hot water are needed and that there is no expense associated with a permanently lit pilot light, all serve to increase the system efficiency and fuel economy.

As an additional advantage, having a response of 2° C. of temperature difference between the storage tank (3) and the solar panel (4), the heating during the highest radiation hours is much faster and more efficient than in a traditional system when it comes to transferring the energy of the sun to the water.

When a small demand for hot water occurs, the solar water heater (4) will feed previously heated water to the backup heater (2), which will not ignite unless the temperature is lower than 35° C. When large demands for hot water occur, water previously heated by the solar water heater (4) will be fed to the backup water heater (2), which will be activated when the water temperature in the storage tank (3) falls below 35° C. and there is a flow of water, and will be turned off when there is no further demand for water.

This heater has seven pipes with corrugated coils (12) which contain fins in order to reach outlet temperatures lower than 200° C., to transfer between 82% and 90% of the thermal energy of the burner (13), which is lit gradually by an electrical spark emitted by a spark plug (30) connected to the switchboard or control which in turn sends the signal to open the electrovalve (18). Once the burner (13) is ignited, the electric current generated by the first spark plug (30) is transformed by the ionization effect, changing the polarization of the current, and is detected by another spark plug (32) that emits the change signal to the switchboard or control. If the current change signal is not detected by the switchboard or control, the system is blocked until the system is restarted manually.

Additionally, the system of the present invention protects the solar panel when the temperature falls below 4° C., by activating the recirculation system.

It should be readily appreciated by those skilled in the art that various modifications and variations can be made to the embodiments of the method and systems described herein. It is intended that the present invention encompass such modifications and variations as come within the scope of the appended claims and their equivalents.

The invention claimed is:

1. A solar water heating system with a forced recirculation backup water, comprising:
   a solar panel, and a solar panel storage tank, wherein the solar panel is disposed below the solar panel storage tank to achieve a thermosiphon effect between the solar panel and solar panel storage tank;
   a backup heater system having a corrosion resistant tank with a multi-tube heat exchanger, a burner, and a gas feed valve system including at least one electrovalve configured to deliver a gas to said burner;
   a plurality of bimetallic temperature detectors, wherein a first bimetallic temperature detector detects temperature of water in said solar panel, a second bimetallic temperature detector detects temperature of water in said solar panel storage tank, and a third bimetallic temperature detector detects temperature of water in said back up heater system tank;
   a first spark plug positioned to ignite said burner, and a second spark plug positioned to detect current changes in said first spark plug generated by ionization effect after said burner is ignited;
   a backup heater controller in operative communication with said electrovalve, said third bimetallic temperature detector, and said first and second spark plugs to send a current to said first spark plug upon detection of a low setpoint temperature from said third bimetallic temperature detector, said backup heater controller causing gradual opening of said electrovalve to supply gas to said burner to ignite said burner with said first spark plug;
   said backup heater controller configured to detect the change of current from said second spark plug and to close said electrovalve and terminate operation of said water heater if the change of current is not detected within a defined time and to generate a visual display of equipment error;
   and a forced recirculation system between said solar panel and said solar panel storage tank that includes a recirculator configured to recirculate water between said solar panel and said storage tank as a function of a detected temperature difference between said first and second bimetallic temperature detectors.

2. The solar water heating system as in claim 1, wherein said backup heater system is turned on upon detection of a temperature less than 35 degrees Celsius in said backup heater system tank.

3. The solar water heating system as in claim 1, wherein said backup heater system is turned off upon detection of a temperature greater than 60 degrees Celsius in said backup heater system tank.

4. The solar water heating system as in claim 1, further comprising a flow detector disposed to detect water flow out of said backup heater system tank, said flow detector in communication with said backup heater controller such that activation of said electrovalve requires a signal from said flow detector indicating a water demand on the system.

5. The solar water heating system as in claim 1, further comprising an electronic controller configured to control power distribution to said backup heater controller, and power supplied to said recirculator as a function of the detected temperature difference between the first and second bimetallic temperature detectors.

6. The solar water heating system as in claim 1, wherein said backup heater controller activates said electrovalve to supply gas to said burner no sooner than 1.5 seconds after causing said first spark plug to spark, and closes said electrovalve if the change of current is not detected within 5.0 seconds of opening said electrovalve, said backup heater controller configured to wait a defined time until making at least one additional attempt to start said burner, and displaying the visual indication of equipment error upon failure of the additional attempt.

7. The solar water heating system as in claim 1, wherein the backup heater controller operates in an automatic mode or in a manual mode wherein said backup heater system is controlled as a function of a manually input setpoint temperature.

8. The solar water heating system as in claim 1, wherein said solar panel has a flat surface capturing area of at least 2 $m^2$.

9. The solar water heating system as in claim 1, further comprising a relief valve configured with said solar panel storage tank.

10. The solar water heating system as in claim 1, wherein said recirculator is activated when water temperature in said solar panel drops below 4 degrees Celsius.

* * * * *